United States Patent
Moreau et al.

(10) Patent No.: US 8,544,179 B2
(45) Date of Patent: Oct. 1, 2013

(54) INSPECTION METHOD OF GAUGE FOR A SELF-LOCKING THREADING OF A TUBULAR CONNECTION USED IN THE OIL INDUSTRY

(75) Inventors: Regis Moreau, Flaumont Waudrechies (FR); Jean-Luc Coulon, Monceau Saint Waast (FR); Jean-Guillaume Besse, Valenciennes (FR); Pierre-Yves Bakalemian, Saint Saulve (FR); Pierre Martin, Valenciennes (FR)

(73) Assignees: Vallourec Mannesmann Oil & Gas France, Aulnoye-Aymeries (FR); Sumitomo Metal Industries, Ltd., Osaka-shi (JP)

( * ) Notice: Subject to any disclaimer, the term of this patent is extended or adjusted under 35 U.S.C. 154(b) by 143 days.

(21) Appl. No.: 13/126,387

(22) PCT Filed: Oct. 26, 2009

(86) PCT No.: PCT/EP2009/007628
§ 371 (c)(1),
(2), (4) Date: Apr. 27, 2011

(87) PCT Pub. No.: WO2010/049102
PCT Pub. Date: May 6, 2010

(65) Prior Publication Data
US 2011/0203125 A1    Aug. 25, 2011

(30) Foreign Application Priority Data

Oct. 30, 2008 (FR) .................. 08 06047
May 29, 2009 (FR) .................. 09 02604

(51) Int. Cl.
*G01B 3/48* (2006.01)
*G01B 3/36* (2006.01)

(52) U.S. Cl.
USPC .................................... 33/199 R

(58) Field of Classification Search
USPC ................................... 33/199 R
See application file for complete search history.

(56) References Cited

U.S. PATENT DOCUMENTS 1,792,936 A    2/1931   Skarl
1,954,852 A *  4/1934   Thomson ............. 33/199 R
4,213,247 A *  7/1980   Romine .............. 33/199 R (Continued)

FOREIGN PATENT DOCUMENTS

CN    201027758 Y    2/2008
CN    201087537 Y    7/2008

(Continued)

OTHER PUBLICATIONS

International Search Report issued Nov. 30, 2009 in PCT/EP09/07628 filed Oct. 26, 2009.

*Primary Examiner* — Christopher Fulton
(74) *Attorney, Agent, or Firm* — Oblon, Spivak, McClelland, Maier & Neustadt, L.L.P.

(57) ABSTRACT

A method and a gauge for inspecting a self-locking threading provided close to one end of a tubular component used for exploration or operation of hydrocarbon wells, the threading including a lead with a constant width and thread root widths that increase in the direction of a distal surface of the tubular component. The gauge can be displaced in the self-locking threading to a locking position, the locking position then being marked and compared with a reference locking position.

36 Claims, 6 Drawing Sheets

(56) References Cited

U.S. PATENT DOCUMENTS

| | | | | |
|---|---|---|---|---|
| 4,260,005 | A | * | 4/1981 | Stencel ............... 411/3 |
| 4,293,262 | A | * | 10/1981 | Holmes ............... 411/311 |
| 4,351,626 | A | * | 9/1982 | Holmes ............... 411/311 |
| 4,417,402 | A | * | 11/1983 | Hattan ............... 33/199 R |
| 4,614,120 | A | * | 9/1986 | Fradin et al. ............... 73/761 |
| 4,618,465 | A | * | 10/1986 | Parks ............... 264/40.1 |
| 4,934,059 | A | * | 6/1990 | Green ............... 33/199 R |
| 5,020,230 | A | * | 6/1991 | Greenslade ............... 33/199 R |
| 5,134,783 | A | * | 8/1992 | Perry ............... 33/645 |
| 5,199,175 | A | * | 4/1993 | Green ............... 33/199 R |
| 7,299,555 | B2 | * | 11/2007 | Muradov et al. ............... 33/199 R |
| 2006/0261595 | A1 | | 11/2006 | Verger et al. |
| 2007/0214664 | A1 | | 9/2007 | Muradov et al. |

FOREIGN PATENT DOCUMENTS

| | | |
|---|---|---|
| EP | 1 837 620 | 9/2007 |
| FR | 954 265 | 12/1949 |
| GB | 1 531 130 | 11/1978 |

* cited by examiner

INSPECTION METHOD OF GAUGE FOR A SELF-LOCKING THREADING OF A TUBULAR CONNECTION USED IN THE OIL INDUSTRY

The present invention relates to a method and gauge for inspection of a self-locking threading provided close to one end of a tubular component used in the exploration or operation of hydrocarbon wells. The invention also relates to a method for manufacturing a connection used in the exploration or operation of hydrocarbon wells.

Conventionally, tubes are connected by make-up, said tubes being intended to constitute a casing or tubing in the context of operating a hydrocarbon well. In general, such tubes comprise an end provided with a male threaded zone and an end provided with a female threaded zone, each intended to be connected by make-up with the corresponding end of another component, make-up defining a connection. The string thus constituted may be rotated when drilling of the well is carried out vertically, in order to allow said string to advance towards the bottom of the well or horizontally when the hole is horizontal. For this reason, the components must be made up together with a high torque in order on the one hand to transmit a sufficient rotational torque to allow the string to advance through the well and on the other hand to prevent it from breaking out. In conventional products, the make-up torque is generally achieved by tightening of abutment surfaces provided on each of the components intended to be made up. However, because of the extent of the abutment surfaces is a fraction of the thickness of the tubes, a critical plastification threshold is rapidly reached for the abutment surfaces, when too high a tightening torque is applied.

For this reason, developments dedicated, for example, to connections such as those sold by the Applicant under the trade name VAM® HTF have in particular been made on the threadings in order to be able to unload the abutment surfaces of at least a portion or even all of the forces which they could not accommodate. The aim was achieved using self-locking threadings as described in document FR-2 855 587. In self-locking threadings of that type of connection, the threads of the male end and the threads of the female end have a constant lead but have thread widths which vary. More precisely, the widths of the thread crests increase progressively for the threads of the male end, or respectively female end, with increasing distance from the male or respectively female end. Thus, during make-up, the male and female threads finish by locking into each other in a position corresponding to a locking point. More precisely, locking occurs for self-locking threadings when the flanks of the male threads lock against the corresponding flanks of the female threads.

For this reason, the make-up torque is taken up by all of the contact surfaces between the flanks, i.e. a total surface area which is substantially higher than that constituted by abutment surfaces of the prior art.

However, because of the variation in the dimensions relative to the widths of the threads, connections with self-locking threadings are very complex to machine. Hence, the slightest variation outside the machining tolerance shifts the locking point of the threads. For this reason, connections with self-locking threadings are not very compatible with the use of abutment surfaces since uncertainties in the locking point of the threads renders their contact point random. Such an incompatibility is not, however, a problem provided that all of the contact surfaces between the flanks allow the abutment surfaces to match up.

While incompatibility of self-locking threadings with the use of abutment surfaces is not a problem, this is not the case with sealing surfaces. It is known that the seal at the connection between two components must be guaranteed; the tightness of the seal must be high when the string transports gas under pressure. To this end, it is known to provide on the male end of the connection, beyond the threaded zone, a sealing surface intended to cooperate by interference fitting with a sealing surface provided on the female end of the connection. More precisely, cooperation by interference fitting between the two surfaces is carried out by force-fitting the sealing surface of the male end under the sealing surface of the female end during assembly of the connection by make-up. Knowing that the seal results from very precise positioning of the sealing surfaces which are able to mate together, it appears that the locking point of the machined connection must correspond to the locking point referenced on the manufacturing drawings.

For this reason, it is necessary to be able to inspect the conformity of self-locking threadings; and this constitutes the object of the invention.

More precisely, the invention pertains to a gauge for inspecting a self-locking threading provided close to one end of a tubular component for exploration or operation of hydrocarbon wells, said threading having thread root widths which decrease to a minimum value from the distal surface of the tubular component, characterized in that the gauge comprises a base carrying at least one first thread which can be displaced in the self-locking threading to a locking position B.

In accordance with certain characteristics, when said gauge is intended to inspect the threading of a male end, the height of the first thread of the gauge is greater than the height of the threads of the threading.

In accordance with other characteristics, when said gauge is intended to inspect the threading of a female end, the height of the first thread of the gauge is lower than the height of the threads of the threading.

In accordance with other characteristics, the inspection gauge comprises at least one second thread suitable to guide the gauge in the self-locking threading.

In accordance with other characteristics, the first and second threads have the same width.

In accordance with other characteristics, the thread(s) has/have a radius of curvature which is substantially equal to that of the threading in order to match the shape of the threading.

In accordance with other characteristics, the thread(s) has/have a generatrix with a taper substantially equal to that of the tubular component.

In accordance with other characteristics, the thread(s) has/have a circumferential length "l" in the range 3% to 79% of the external diameter of the tubular component.

In accordance with other characteristics, the surface of the thread(s) is treated to obtain a hardness of more than 35 HRC.

In accordance with other characteristics, the surface of the thread(s) is treated to obtain a roughness Ra of 0.8 µm or less.

The invention also concerns a method for inspecting the conformity of a self-locking threading provided close to one end of a tubular component used in the exploration or operation of hydrocarbon wells, said threading having thread root widths which decrease to a minimum value from the distal surface of the tubular component, characterized in that:

- an inspection gauge in accordance with any one of the preceding claims is engaged in one of the threads close to the distal surface of the tubular component;
- the gauge is displaced so as to be moved away from the distal surface of the tubular component until the gauge is locked in a locking position;

the locking position is marked;

the marked locking position is compared with a reference locking position.

In accordance with certain characteristics, marking of the locking position of the gauge consists in measuring the distance between the distal surface of the tubular component and the load flank of the first thread of the gauge.

In accordance with other characteristics, the width of the first thread of the inspection gauge is selected as a function of a reference locking position determined arbitrarily on the threading.

In accordance with other characteristics, the reference locking position on the threading is determined as a function of the width of the first arbitrarily fixed thread.

The invention also relates to a method for manufacturing a threaded connection used in the drilling and operation of hydrocarbon wells characterized in that it comprises the following steps:

A first and a second tubular components are provided, said first and second tubular components comprising at their end and on their peripheral surface, respectively a first and a second threadings having thread root widths which decrease from the distal surface of the end of the tubular components, so that the male and female threadings be complementary and be able to cooperate together by self locking tightening.

an inspection gauge in accordance with the invention is engaged in each threading, until the gauge is locked in a locking position.

a mark is provided on the external peripheral surface of the tubular components, said mark extending longitudinally according to a direction located in the same plane as the rotational axis of said components, said plane comprising the locking position B determined at the previous step, self locking threadings are screwed under a predetermined make-up torque C0 and so that the angular gap between the marks is approximately equal to a predetermined value.

In accordance with certain characteristics, self locking threadings are also inspected in conformity with an inspection method according to the invention.

In accordance with certain characteristics, the angular gap is approximately equal to zero, the width of the gauge used to inspect the male self locking threading being the same one as the width of the gauge used to inspect the female self locking threading, so that the locking positions determined for the male and female threadings are located in a same plane comprising the rotational axis of the tubular components.

In accordance with other characteristics, a mark is provided on the external peripheral surface of the tubular component comprising the male threading end, said mark extending circumferentially, so that the distal surface of the end comprising the female threading and the mark reach a predetermined position one with respect to the other when the make up torque reaches a predetermined value.

In accordance with other characteristics, both the male and female ends of the tubular components comprise each respectively at least a sealing surface, said surfaces being able to mate together by tightening to constitute a sealing zone when the threadings cooperate according to a self locking screwing.

Other advantages and characteristics of the invention will become apparent from the following detailed description given by way of non-limiting examples and with reference to the accompanying drawings, which not only serve to understand the invention better, but also, if necessary, to contribute to the definition of the invention.

Figure 3:
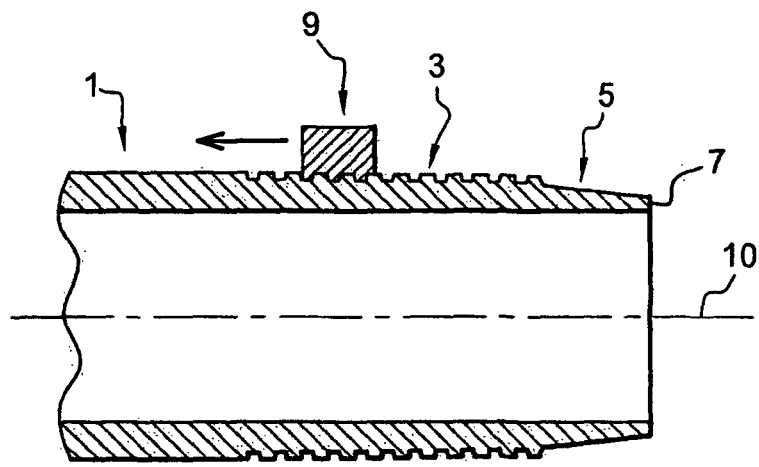
Figure 4:
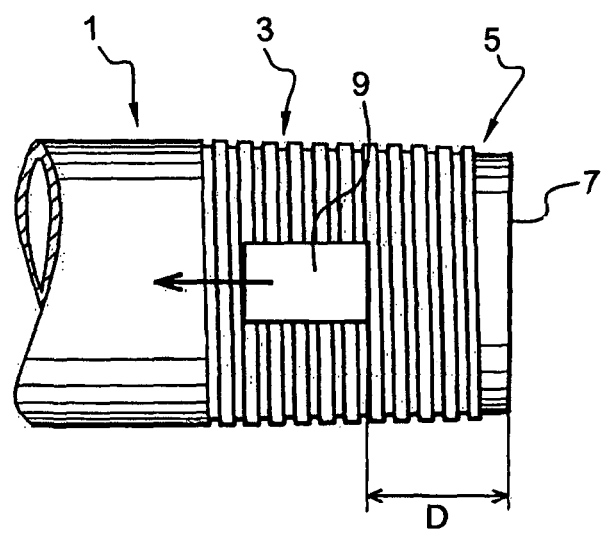
Figure 5:
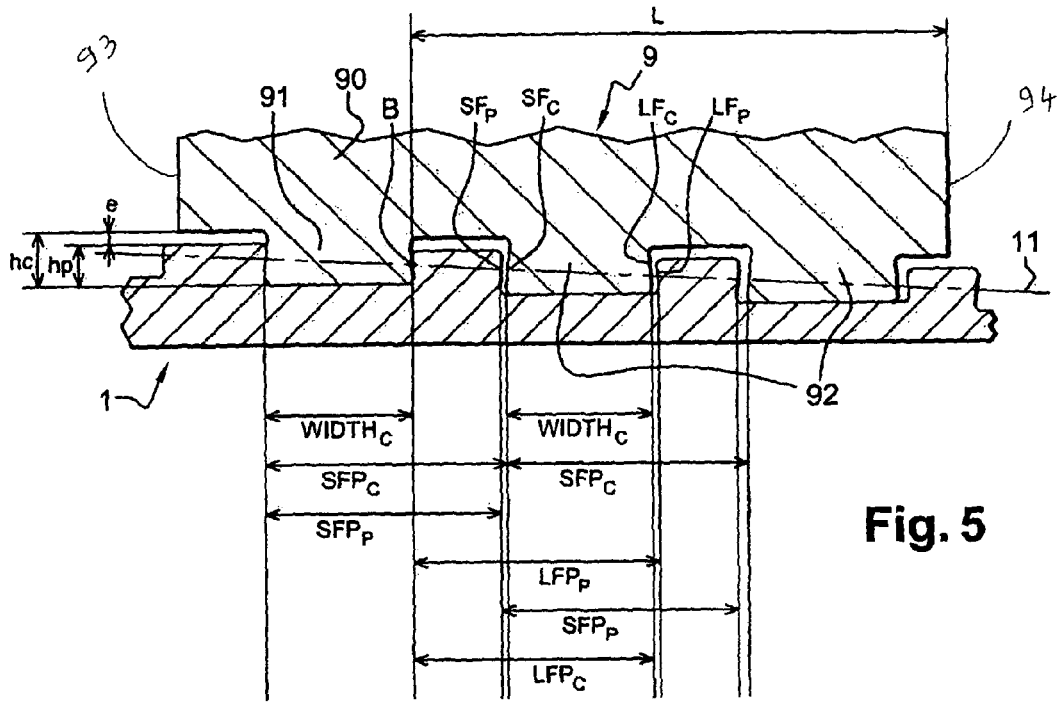

FIGS. 3 and 4 respectively represent a sectional view and a top view of an embodiment of the invention;

FIG. 5 shows a detailed view of the embodiment of the invention mentioned above.

Figure 6:
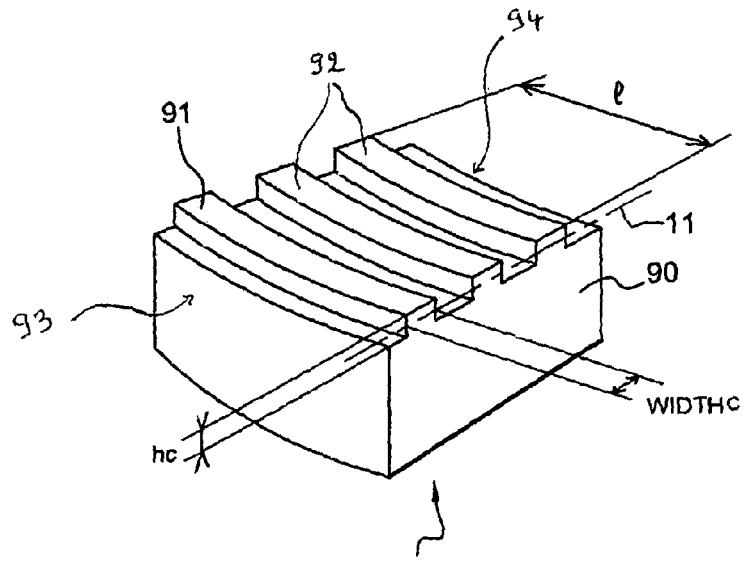

FIG. 6 shows a perspective view of an embodiment in accordance with the invention.

Figure 7:
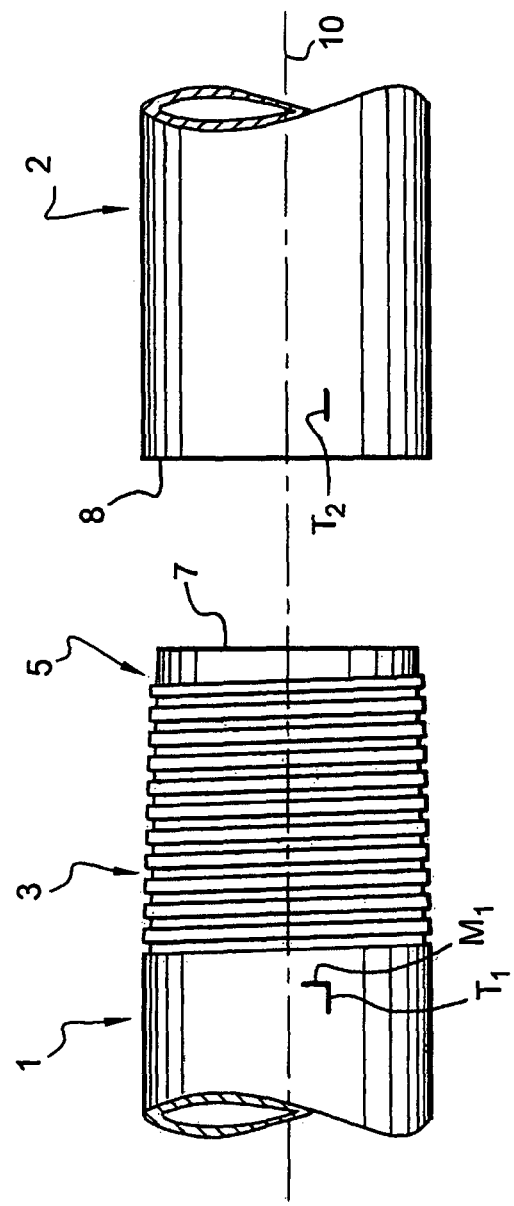

FIG. 7 shows a top view of two tubular components in accordance with the invention.

Figure 8:
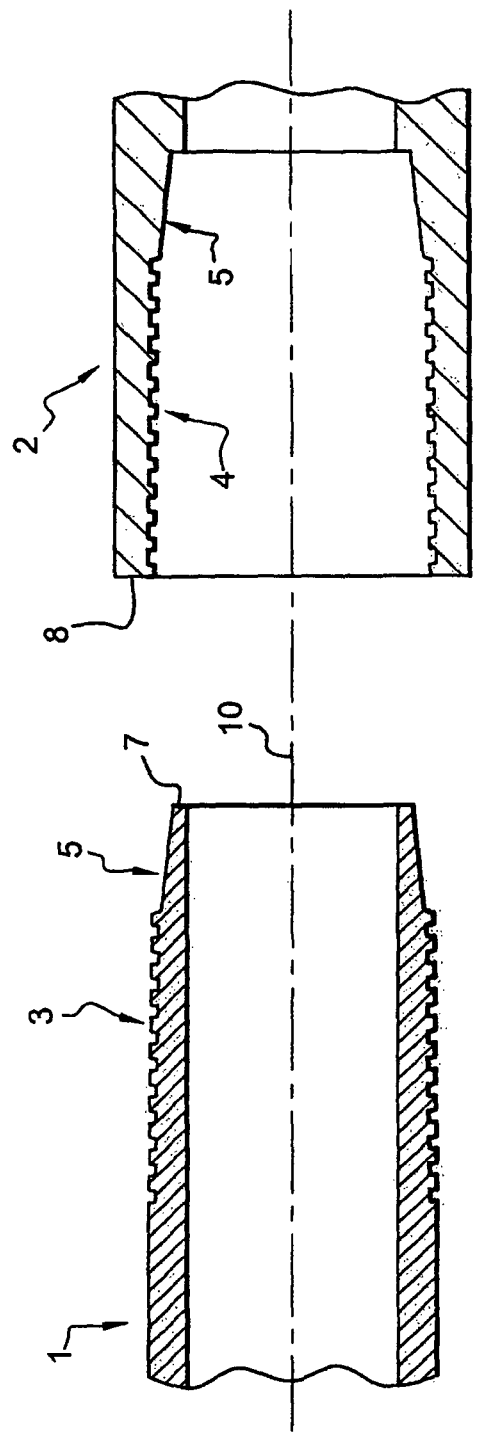

FIG. 8 shows a longitudinal sectional view of two tubular components in accordance with the invention.

Figure 9:
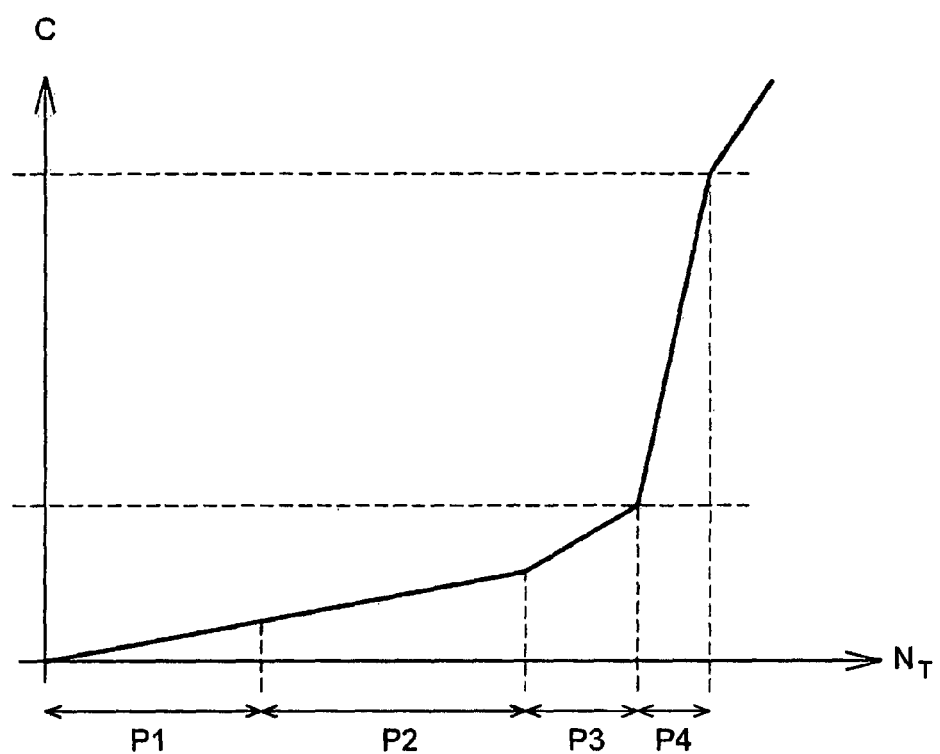

FIG. 9 represents a make up curve of two tubular components in accordance with the invention.

Figure 1:
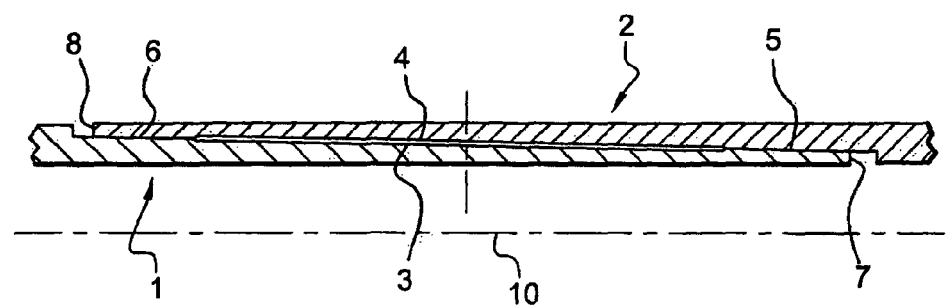
FIG. 1 shows a sectional view of a connection comprising a self-locking threading.

FIG. 1 shows a connection between two substantially tubular components intended to be joined together by means of self-locking threadings and intended to be integrated into a hydrocarbon well string. The connection is conventionally composed of a component provided with a male end 1 and a component provided with a female end 2, the male end 1 being capable of being joined to the female end 2. In this type of connection, the end 1 comprises a first and a second sealing surface which respectively are capable of cooperating by interference with a corresponding first and a second sealing surface on the female end 2, to form a first 5 and a second 6 sealing zone. The end 1 also comprises a male threaded zone 3 which can be screwed into a corresponding threaded zone 4 of the female end 2, the threaded zones being provided between the two sealing surfaces 5 and 6. The ends 1 and 2 each terminate in a distal surface 7 and 8 respectively.

Figure 2:
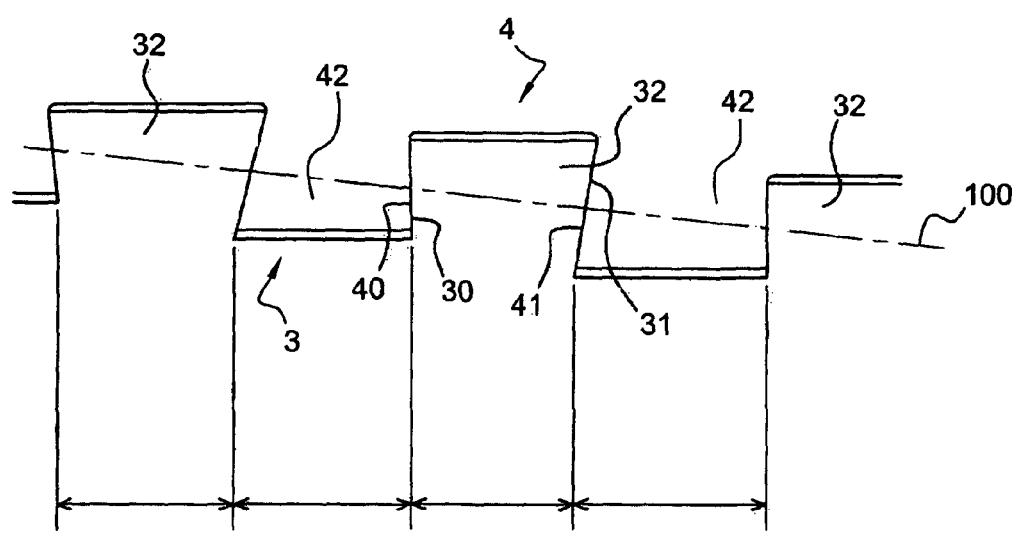
FIG. 2 shows a detail of a sectional view of self-locking threads of a connection.

As can be seen in FIG. 2, which shows details of the threaded zones 3 and 4, said threaded zones produce a self-locking threading. The term "self-locking threadings" means threadings comprising the characteristics detailed below. The male threads 32, like the female threads 42, have a constant lead while their width decreases in the direction of their respective distal surface 7, 8, such that during make-up, the male threads 32 and female threads 42 finish by locking each other in a predetermined position. More precisely, the lead between the load flanks 40 of the female threading 4 is constant, as is the lead between the stabbing flanks 41 of the female threading, with the particular feature that the lead between the load flanks 40 is greater than the lead between the stabbing flanks 41. Similarly, the lead between the stabbing flanks 31 of the male threading 3 is constant, as is the lead between the load flanks 30 of the male threading, with the particular feature that the lead between the stabbing flanks 31 is lower than the lead between the load flanks 30. It should be noted that the contact is principally made between the male load flanks 30 and female load flanks 40, like the male stabbing flanks 31 and female stabbing flanks 41. In contrast, a clearance is generally provided between the male thread crests and the female thread roots; similarly, a clearance is provided between the male thread roots and the female thread crests, to facilitate progress during make-up and avoid any risk of galling.

Advantageously and conventionally, the male and female threads have a dovetail profile such that they are solidly nested in each other after make-up. This supplemental guarantee avoids the risk of jump-out, which corresponds to disconnection of the male and female threads when the connection is subjected to high bending or tensile stresses. "Dovetail profile" usually means that the angles of the stabbing and load flanks of the male and female threads are negative. In other words the width of the thread base is smaller than the width of the thread crest.

Advantageously, and conventionally, the ends 1 and 2 have a tapered profile which follows a tapered generatrix 100 to facilitate make-up of the male element into the female element.

Advantageously, threadings 3 and 4 are orientated in a tapered generatrix 100 to facilitate the progress of make-up. In general, said tapered generatrix forms an angle with the axis 10 which is in the range 1.5° to 5°. In the present case, the tapered generatrix which is defined passes through the centre of the load flanks.

In accordance with an embodiment of the invention and as shown in FIGS. 3 and 4, a gauge 9 is shown which can inspect a male self-locking threading 3 provided close to one end of a tubular component 1 used in the exploration or operation of hydrocarbon wells, said threading having a lead $LFP_p$ of constant width between the load flanks, and similarly a lead $SFP_p$ of constant width between the stabbing flanks, as well as thread root widths which increase from a value $WIDTH_{min}$ to a value $WIDTH_{max}$ in the direction of the distal surface 7 of the tubular component.

As can be seen in FIG. 5, the gauge 9 comprises a base 90 carrying a first thread 91 which is capable of being displaced in the self-locking threading 3 to a locking position B.

The expression "capable of being displaced in the self-locking threading 3 to a locking position B" means that the width of the crest $WIDTH_c$ of the first thread 91 must be greater than the minimum value $WIDTH_{min}$ of the thread root widths of the threading 3, such that a locking position B is reached. Clearly, the crest width $WIDTH_c$ of the first thread 91 must also be smaller than the value $WIDTH_{max}$ of the widths of the thread roots of the threading 3 so that the gauge 9 can be engaged in the threading 3 on the distal surface 7 side.

The expression "capable of being displaced in the self-locking threading 3 to a locking position B" also means that the first thread 91 must also have a complementary shape to that of the threading 3. Thus, in the case in which the threading 3 has a dovetail profile, the first thread 91 must also have a complementary dovetail profile. More generally, the angles which the flanks, the crests and the roots of the first thread form must be identical to those of the threading being inspected.

The expression "capable of being displaced in the self-locking threading 3 to a locking position B" also means that the thread 91 has a radius of curvature which is greater than that of the threading 3 when it is a male component, and smaller than that of the threading 4 when it is a female component.

Advantageously, the thread 91 has a radius of curvature which is substantially equal to that of the threading in order to match as closely as possible the shape of the threading during progress of the gauge along the tubular component.

Advantageously, the height hc of the first thread 91 of the gauge 9 is greater than the height hp of the threads of the threading 3, thereby defining a clearance e, such that the thread crest 91 is always in contact with the base of the threading 3. For this reason, the thread 91 inspects the width of the threading 3 at the thread root.

In contrast, when the threading to be inspected is a female threading 4, the height of the first thread 91 of the gauge 9 is advantageously lower than the height of the threads of the threading 4, so that the root of the thread 91 is always in contact with the threading 4. For this reason, the thread 91 inspects the width of the threading 4 at the thread crest.

Advantageously and as shown in FIGS. 5 and 6, the gauge 9 further comprises second and third threads 92 which can guide the gauge during progress of the gauge 9 along the male self-locking threading 3. This also prevents the gauge from pivoting when it is in the locked position, which would then render the measurements inaccurate. Clearly, the second and third threads 92 succeed the first thread 91 so that when the gauge 9 is mounted on the tubular component to be inspected, they are located between the first thread 91 and the distal surface 7 of the tubular component.

Advantageously, the first 91, second and third 92 threads correspond to a threading with a constant lead and a constant thread width, so that machining of the gauge 9 is facilitated and so that only the first thread 91 and not the second and third can be locked in the threading 3. In other words, an axial clearance is provided between the load flank $LF_c$ of the threads 92 and the load flank $LF_p$ of the thread corresponding to the male threading 3; similarly, a clearance is provided between the stabbing flank $SF_c$ of the threads 92 and the stabbing flank $SF_p$ of the corresponding thread of the male threading 3 and this to ensure that locking takes place by means of thread 91. In other words, the characteristics of the threading provided on the gauge 9 are expressed as follows:

$$SFP_p < SFP_c \approx LFP_c < LFP_p, \text{ in which:}$$

$SFP_p$: width of lead between the stabbing flanks of the threading 3;

$LFP_p$: width of lead between the load flanks of the threading 3;

$SFP_c$: width of lead between the stabbing flanks of the gauge;

$LFP_c$: width of lead between the load flanks of the gauge.

Advantageously, the threads 91 and 92 have a tapered generatrix 11 which is substantially equal to the tapered generatrix 100 of the threading 3, in order to facilitate insertion and extraction of the gauge 9 with respect to the threading. More generally, it is advantageous for the gauge to have a taper which is smaller than that of the male threading and greater than that of the female threading, to facilitate progress of the gauge.

Advantageously, the threads 91 and 92 have a circumferential length l in the range 3% to 79% of the external diameter OD of the tubular component 1. With this range, the gauge then covers between 1% and 25% of the circumference of the threading 3, which also improves guidance of the gauge 9.

Advantageously, the gauge is provided from a tool type steel and treated to be wear resistant. In order to further increase the wear resistance of the gauge, it is advantageous to use superficial surface hardening treatments such as nitriding, surface quenching, etc. A hardness of more than 35 HRC is recommended.

Advantageously, particularly interesting results may be obtained by carrying out rectification type finishing. In addition to increasing the wear resistance, a gauge is also obtained which is less aggressive towards the threading being inspected. A roughness Ra of 0.8 μm or less is recommended.

Advantageously, the gauge 9 comprises markings to demarcate the face adjacent to the thread 91 and the face adjacent to the guidance thread. This then enables the gauge to be mounted on the threading in the right direction and to define the distance L between the load flank of the thread 91 of the gauge 9 and the surface adjacent to the guide thread.

In FIGS. 4 and 5, the method for inspecting the conformity of a self-locking threading provided close to one end of a tubular component 1 used in the exploration or operation of a hydrocarbon well comprises the following steps:

engaging an inspection gauge 9 in one of the threads close to the distal surface 7 of the tubular component;

displacing the gauge to move it away from the distal surface 7 of the tubular component until the gauge is locked;

marking the position at which the gauge is locked;

comparing the marked locking position with a reference locking position.

Advantageously, marking the locking position B of the gauge consists in measuring the distance D between the distal surface 7 of the tubular component 1 and the gauge 9 in the locked position. More precisely, knowing the distance L between the load flank of the thread 91 of the gauge 9 and the face 94 opposite to the face 93 adjacent to the thread 91 of the gauge 9 then by measuring (with calipers, for example, or the equivalent) said distance D, the distance between the load flank of the thread 91 and the surface 7 can be deduced. It should be noted that the face opposite to the face adjacent to the thread 91 of the gauge 9 is perpendicular to the axis 10 of the tubular component so as to be parallel to the distal surface 7, 8.

In accordance with a first implementation of the method, an inspection gauge which is dedicated to the connection to be inspected is used such that the locking position of the gauge 9 is chosen arbitrarily, this locking position determining the dimensions of the gauge 9. Thus, for a given threading, the manufacturing drawing specifies the following values:

LFP: lead of load flank;
SFP: lead of stabbing flank;
Wr=LFP−SFP: variation in width of threads for a complete turn.

Next, a reference position on the threading located on the load flank is arbitrarily selected at a distance $L_p$ from the distal surface 7 and corresponding to a thread width $WIDTH_p$. Next, a number N of leads is selected at the end of which the gauge must be locked; then the width $WIDTH_c$ of the thread 91 to be used can be deduced therefrom. This latter is given by the formula:

$$WIDTH_c = WIDTH_p - N\,W_r$$

The distance D which must be measured between the inspection gauge and the distal surface 7 is then given by the formula:

$$D = L_p + N\,LFP - L$$

It has been shown above that marking the locking position of the gauge consists in adding the distance D between the distal surface 7 of the tubular component 1 and the gauge to the distance L between the load flank of the thread 91 of the gauge 9 and the end opposite to the thread 91 of the gauge 9.

This first implementation of the method has the advantage of allowing the locking position of the gauge to be selected. Thus, the length of threading on which the inspection is carried out can be maximized.

Clearly, it is necessary, once the gauge has been provided, to validate the conformity of the width $WIDTH_c$ in order to verify that the tooth has been properly machined.

Clearly, the first implementation of the method described above is applicable both to a threading provided on a male end and to a threading provided on a female end.

In a second implementation of the method, a single inspection gauge is used the dimensions of which are selected arbitrarily. Thus, the locking position of the gauge must be determined as a function of the dimensions of the gauge. More precisely, for a given width of the first thread 91, $WIDTH_c$, the manufacturing drawings must be referred to in order to find:

LFP: lead of load flank;
SFP: lead of stabbing flank;
Wr=LFP−SFP: variation in width of threads for a complete turn.

In addition, a reference position is selected on the threading located on the load flank at a distance $L_p$ from the distal surface 7 and corresponding to a thread width $WIDTH_p$.

From these values specified on the manufacturing drawings, N is deduced, the number of leads from the reference position, after which the gauge must be locked, namely:

$$N = (WIDTH_p - WIDTH_c)/Wr$$

The reference distance D which must be measured between the inspection gauge and the distal surface 7 is also deduced therefrom using the formula:

$D = L_p + N\,LFP - L$, L being the distance between the load flank of the thread 91 of the gauge 9 and the end opposite to the thread 91 of the gauge 9.

This second implementation of the method has the advantage of using a universal gauge which means that different connections can be inspected.

The invention also relates to a method for manufacturing a threaded connection used in the drilling or operation of hydrocarbon wells characterized in that it comprises the steps detailed hereinafter.

As showed on FIGS. 7 and 8, a first tubular component is provided, said component having a rotational axis 10 and comprising on the external peripheral surface of one of its ends 1 a male threading 3 having thread root widths which decrease from the distal surface 7 of the end 1. A second tubular component is provided, said component having the same rotational axis 10 and comprising on the internal peripheral surface of one of its ends 2 a female threading 4 having thread root widths which decrease from the distal surface 8 of the end 2. Male and female threadings 3, 4 are complementary and able to mate together by self locking tightening. We precise that machining operations of tubular components are known from a man skilled in the art and they comprise among others the step of mounting the tubular components between the jaws of a lathe and the step of machining threadings at the ends of the components by means of a cutting tool which can be moved with respect to a lathe structure from a given position under a computer numerical control program.

Then, an inspection gauge 9 is engaged in each threading 3, 4 in accordance to the invention and displaced to a locking position B.

Then, a longitudinal mark T1, T2 is provided on the external peripheral surface of each tubular component 1, 2. The marks T1 and T2 extend longitudinally according to a direction located in a same plane comprising the rotational axis 10 of said components 1, 2, said plane comprising the locking position B determined at the previous step.

The longitudinal mark T1 realised on the end 1 and comprising the male threading is located out of the threading 3 and on the side of the threading opposite to the distal surface 7.

Then, self locking threadings 3, 4 are screwed under a predetermined make-up torque C0 and so that the angular gap between the longitudinal marks T1, T2 is approximately equal to a predetermined value A0. Usually, the torque C0 is chosen according to the API (American Petrol Institute) specifications and according to the features and to the use of the connection.

By such way, the radial position of the tubular components one relative to the other is controlled by means of the longitudinal marks T1 and T2. That enables to verify after make up if the locking position B is reached. Indeed, apparatus applying predetermined make up torque C0 can yield incorrect make up position. Likewise, the use of lubricant can yield false reading of the make up torque.

It is required to check if the make up torque C0 has been reached, and that especially in case the tubular components are drilling products which are prone to breaking out during drilling operation. It is required also to check very precisely the relative position of male and female threadings one with respect to the other, in the case where said components comprise sealing portions 5, 6.

Indeed, such sealing portions result from tightening of sealing surfaces, said surfaces being positioned face to face when threadings are made up in the locking position B. Radial marks permit to verify if the sealing surfaces are positioned face to face. As showed on the FIG. 9, the make up step of two tubular components able to form a connection can be usually split in four parts. X-axis shows the number of turns $N_T$ and Y-axis shows the make-up torque C.

A first part P1 during which the male threading of a first tubular component does not present any radial tightening with the corresponding female threading of a second tubular component.

A second part P2 during which the contact between male and female threadings includes a radial tightening increasing with screwing (generating a low but increasing make up torque).

A third part P3 during which the male and female surfaces devoted to form a "metal to metal" sealing portion come face to face and during which male and female threadings begin to cooperate by self locking tightening.

A fourth part P4 during which simultaneously the locking position of the threadings is reached and the sealing surfaces are in contact by tightening to form a sealing portion.

This fourth part P4 represents the last phase of make up in which the torque C0 is reached. This part is very short and needs a very precise positioning.

In case the width of the gauge used to inspect the male self locking threading 3 is the same one as the width WIDTHc of the gauge used to inspect the female self locking threading 4, and if the lubricant used for the make up has no consequence, the locking positions B determined for the male and female threadings are located in a same plane comprising the rotational axis 10 of the tubular components. For this reason, the angular gap A is approximately equal to zero.

Likewise, in case the gauge used to inspect the male self locking threading 3 and the gauge used to inspect the female self locking threading 4 have different widths WIDTHc, said difference being equal to an integer multiple of the variation in thread width for one complete turn, the locking positions determined for the male and female threadings are located in a same plane comprising the rotational axis 10 of the tubular components. For this reason, the angular gap A is approximately equal to zero. The value corresponding to the variation in thread width for one complete turn is as precised previously: Wr=LFP−SFP.

In case the gauge used to inspect the male self locking threading 3 and the gauge used to inspect the female self locking threading 4 are different, the locking positions B determined for the male and female self-locking threadings are not located in a same plane comprising the rotational axis 10 of the tubular components. For this reason, the angular gap A is all the more high as the widths WIDTHc of gauges are different.

During the manufacturing of the threaded connection, it is recommended to verify the conformity of the threadings by means of an inspection method in accordance with the invention.

During the manufacturing of the connection, it is recommended to provide a circumferential mark M1 on the external peripheral surface of the tubular component comprising the end having the male threading 1, said mark extending circumferentially, so that the distal surface 8 of the end 2 comprising the female threading and the mark circumferential M1 reach a predetermined position P0 one with respect to the other when the make up torque reaches a predetermined value C0.

In such a way, not only the radial position of the tubular components one relative to the other is inspected, but the axial position too.

The invention claimed is:

1. A gauge for inspecting a self-locking threading provided close to one end of a tubular component for exploration or operation of hydrocarbon wells, the threading including thread root widths that decrease to a minimum value from a distal surface of the end of the tubular component, the gauge comprising:
a base carrying at least one first thread that can be displaced in the self-locking threading to a locking position,
wherein the gauge is configured to inspect a threading of a male end, and
wherein a height of the at least one first thread of the gauge is greater than a height of threads of the threading.

2. An inspection gauge according to claim 1, further comprising at least one second thread that can guide the gauge in the self-locking threading.

3. An inspection gauge according to claim 2, wherein the first and second threads have a same width.

4. An inspection gauge according to claim 2, wherein the first and second threads have a radius of curvature that is substantially equal to a radius of curvature of the threading to match a shape of the threading.

5. An inspection gauge according to claim 2, wherein the first and second threads have a generatrix with a taper that is substantially equal to a taper of the tubular component.

6. An inspection gauge according to claim 2, wherein the first and second threads have a circumferential length between 3% and 79% of an external diameter of the tubular component.

7. An inspection gauge according to claim 2, wherein surfaces of the first and second threads have a hardness of more than 35 HRC.

8. An inspection gauge according to claim 2, wherein surfaces of the first and second threads have a roughness Ra of 0.8 μm or less.

9. A method for inspecting conformity of a self-locking threading provided close to one end of a tubular component used in exploration or operation of hydrocarbon wells, the threading including thread root widths that decrease to a minimum value from a distal surface of the tubular component, the method comprising:
engaging an inspection gauge in accordance with claim 1 in one of the threads close to the distal surface of the tubular component;
displacing the gauge so as to be moved away from the distal surface of the tubular component until the gauge is locked in a locking position;
marking the locking position; and
comparing the marked locking position with a reference locking position.

10. An inspection method according to claim 9, wherein marking of the locking position of the gauge includes measuring a distance between the distal surface of the tubular component and a load flank of a first thread of the gauge.

11. An inspection method according to claim 9, wherein a width of the first thread of the inspection gauge is selected as a function of the reference locking position determined arbitrarily on the threading.

12. An inspection method according to claim 9, wherein the reference locking position on the threading is determined as a function of an arbitrarily fixed width of a first thread.

13. A method for manufacturing a threaded connection for the drilling or operation of hydrocarbon wells, comprising:
providing first and second tubular components, the first and second tubular components comprising at their ends and on their peripheral surface, respectively, first and second threadings having thread root widths that decrease from a distal surface of an end of the tubular components, so that the male and female threadings are complementary and are able to cooperate together by self locking tightening;
engaging an inspection gauge in accordance with claim 1 in each threading, and displacing the threading to a locking position;
providing a longitudinal mark on an external peripheral surface of the tubular components, the mark extending longitudinally according to a direction located in the same plane as a rotational axis of the components, the plane comprising the locking position determined at a previous engaging;
screwing self locking threadings under a predetermined make-up torque so that an angular gap between the longitudinal marks is approximately equal to a predetermined value.

14. A method for manufacturing a threaded connection according to claim 13, wherein self locking threadings are inspected.

15. A method for manufacturing a threaded connection according to claim 13, wherein the angular gap is approximately equal to zero, a width of the gauge used to inspect the male self locking threading being a same one as a width of the gauge used to inspect the female self locking threading, so that the locking positions determined for self-locking male and female threadings are located in a same plane comprising the rotational axis of the tubular components.

16. A method for manufacturing a threaded connection according to claim 13, wherein a circumferential mark is provided on the external peripheral surface of the tubular component comprising the end having male threading, the circumferential mark extending circumferentially, so that the distal surface of the end comprising the female threading and the circumferential mark reach a predetermined position one with respect to the other when a make up torque reaches a predetermined value.

17. A method for manufacturing a threaded connection according to claim 13, wherein both the male and female ends of the tubular components comprise each respectively at least a sealing surface, the surfaces configured to mate together by tightening to constitute a sealing portion when the threadings cooperate according to a self locking screwing.

18. An inspection gauge according to claim 1, wherein male and female threadings have a dovetail profile, and wherein the first thread has a dovetail profile complementary to the profile of the threadings.

19. A gauge for inspecting a self-locking threading provided close to one end of a tubular component for exploration or operation of hydrocarbon wells, the threading including thread root widths that decrease to a minimum value from a distal surface of the end of the tubular component, the gauge comprising:
a base carrying at least one first thread that can be displaced in the self-locking threading to a locking position,
wherein the gauge is configured to inspect a threading of a female end, and
wherein a height of the at least one first thread of the gauge is lower than a height of threads of the threading.

20. An inspection gauge according to claim 19, wherein male and female threadings have a dovetail profile, and wherein the first thread has a dovetail profile complementary to the profile of the threadings.

21. An inspection gauge according to claim 19, further comprising at least one second thread that can guide the gauge in the self-locking threading.

22. An inspection gauge according to claim 21, wherein the first and second threads have a same width.

23. An inspection gauge according to claim 21, wherein the first and second threads have a radius of curvature that is substantially equal to a radius of curvature of the threading to match a shape of the threading.

24. An inspection gauge according to claim 21, wherein the first and second threads have a generatrix with a taper that is substantially equal to a taper of the tubular component.

25. An inspection gauge according to claim 21, wherein the first and second threads have a circumferential length between 3% and 79% of an external diameter of the tubular component.

26. An inspection gauge according to claim 21, wherein surfaces of the first and second threads have a hardness of more than 35 HRC.

27. An inspection gauge according to claim 21, wherein surfaces of the first and second threads have a roughness Ra of 0.8 μm or less.

28. A method for inspecting conformity of a self-locking threading provided close to one end of a tubular component used in exploration or operation of hydrocarbon wells, the threading including thread root widths that decrease to a minimum value from a distal surface of the tubular component, the method comprising:
engaging an inspection gauge in accordance with claim 19 in one of the threads close to the distal surface of the tubular component;
displacing the gauge so as to be moved away from the distal surface of the tubular component until the gauge is locked in a locking position;
marking the locking position; and
comparing the marked locking position with a reference locking position.

29. An inspection method according to claim 28, wherein marking of the locking position of the gauge includes measuring a distance between the distal surface of the tubular component and a load flank of a first thread of the gauge.

30. An inspection method according to claim 28, wherein a width of the first thread of the inspection gauge is selected as a function of the reference locking position determined arbitrarily on the threading.

31. An inspection method according to claim 28, wherein the reference locking position on the threading is determined as a function of an arbitrarily fixed width of a first thread.

32. A method for manufacturing a threaded connection for the drilling or operation of hydrocarbon wells, comprising:
providing first and second tubular components, the first and second tubular components comprising at their ends and on their peripheral surface, respectively, first and second threadings having thread root widths that decrease from a distal surface of the end of the tubular components, so that the male and female threadings are complementary and are able to cooperate together by self locking tightening;

engaging an inspection gauge in accordance with claim 19 in each threading, and displacing the threading to a locking position;

providing a longitudinal mark on an external peripheral surface of the tubular components, the mark extending longitudinally according to a direction located in the same plane as the rotational axis of the components, the plane comprising the locking position determined at a previous engaging;

screwing self locking threadings under a predetermined make-up torque so that an angular gap between the longitudinal marks is approximately equal to a predetermined value.

33. A method for manufacturing a threaded connection according to claim 32, wherein self locking threadings are inspected.

34. A method for manufacturing a threaded connection according to claim 32, wherein the angular gap is approximately equal to zero, a width of the gauge used to inspect the male self locking threading being a same one as a width of the gauge used to inspect the female self locking threading, so that the locking positions determined for self-locking male and female threadings are located in a same plane comprising the rotational axis of the tubular components.

35. A method for manufacturing a threaded connection according to claim 32, wherein a circumferential mark is provided on the external peripheral surface of the tubular component comprising the end having male threading, the circumferential mark extending circumferentially, so that the distal surface of the end comprising the female threading and the circumferential mark reach a predetermined position one with respect to the other when a make up torque reaches a predetermined value.

36. A method for manufacturing a threaded connection according to claim 32, wherein both the male and female ends of the tubular components comprise each respectively at least a sealing surface, the surfaces configured to mate together by tightening to constitute a sealing portion when the threadings cooperate according to a self locking screwing.

* * * * *

UNITED STATES PATENT AND TRADEMARK OFFICE
CERTIFICATE OF CORRECTION

PATENT NO. : 8,544,179 B2  
APPLICATION NO. : 13/126387  
DATED : October 1, 2013  
INVENTOR(S) : Regis Moreau et al.

Page 1 of 1

It is certified that error appears in the above-identified patent and that said Letters Patent is hereby corrected as shown below:

In the Specification

Column 5, Line 29: Change "WIDTH" to --WIDTH$_C$--.

Signed and Sealed this  
Third Day of June, 2014

Michelle K. Lee  
*Deputy Director of the United States Patent and Trademark Office*